Patented Apr. 22, 1924.

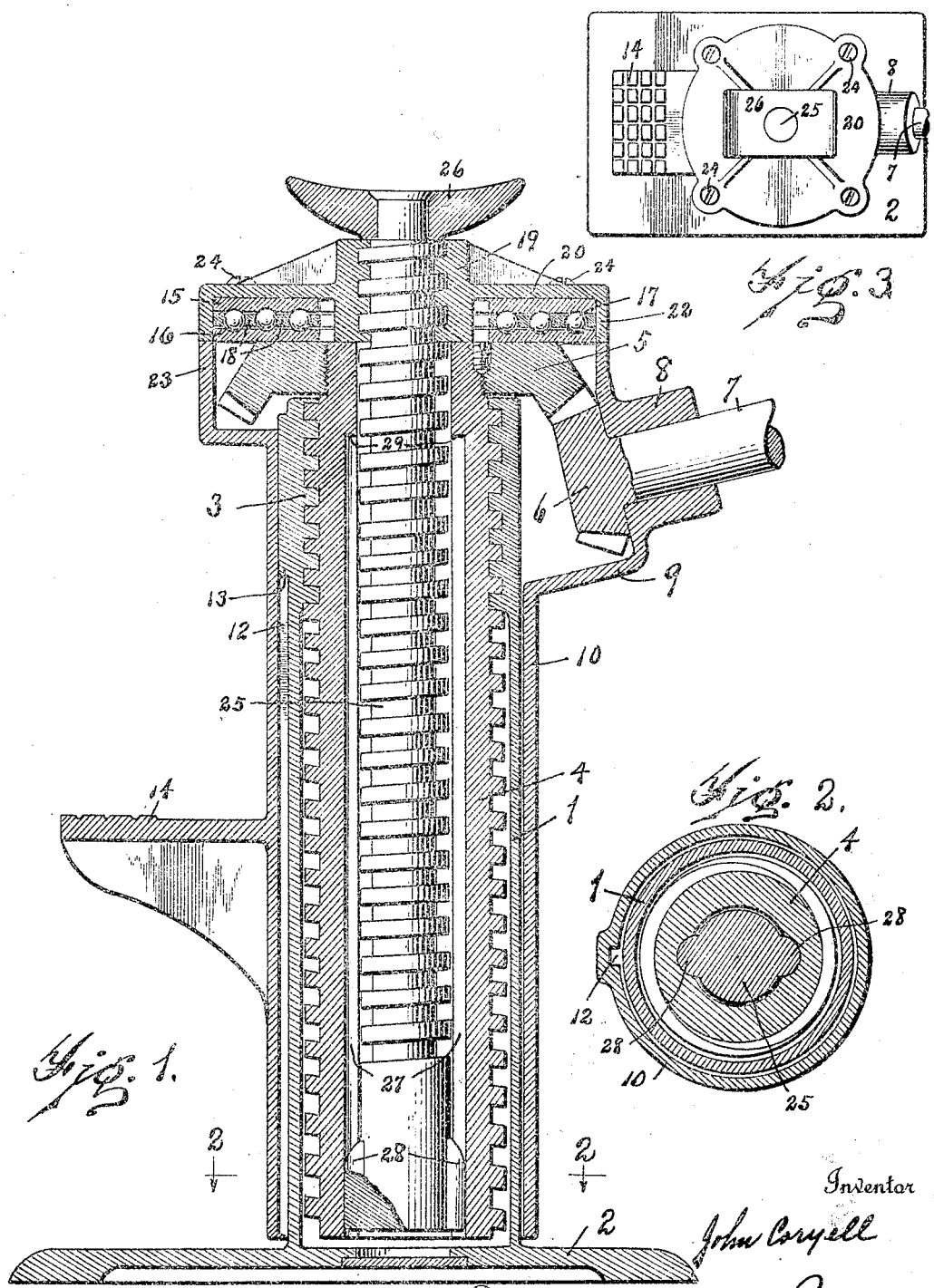

1,491,082

UNITED STATES PATENT OFFICE.

JOHN CORYELL, OF DETROIT, MICHIGAN.

MULTIPLE-SCREW LIFTING JACK.

Application filed October 4, 1922. Serial No. 592,429.

*To all whom it may concern:*

Be it known that I, JOHN CORYELL, a citizen of the United States, and residing at Detroit, in the county of Wayne and State of Michigan, have invented a new and Improved Multiple-Screw Lifting Jack, of which the following is a specification.

This invention relates to that type of lifting jacks in which the relative rotation between a screw and its nut causes the lifting of the load on the jack, and the object of the present invention is to provide a simple, powerful jack which can lift loads through distances greater than the original height of the jack.

This invention consists of a pedestal and a pair of screws within the pedestal, one screw being longitudinally slidable within the other, the outer screw being screw-threaded in the pedestal and the inner screw being mounted in a nut supported by the outer screw, and means to rotate the outer screw.

It also consists in a housing attached to the nut for the inner screw and a foot-lift attached to this housing.

It further consists in the details of construction illustrated in the accompanying drawing and particularly pointed out in the claims.

In the drawing, Fig. 1 is a central vertical section of this improved lifting jack, Fig. 2 is a section on the line 2—2 of Fig. 1, Fig. 3 is a plan of the jack.

Similar reference characters refer to like parts throughout the several views.

The pedestal 1 is preferably cylindrical with a rectangular base 2 and a threaded upper portion 3 in which the hollow outer screw 4 is mounted. Attached to the upper end of this screw 4 is a bevel gear 5 which meshes with the pinion 6 on the shaft 7 journaled in a bearing 8 carried by the bracket 9 which forms part of a housing 10. This housing is also generally cylindrical and is movable up and down relatively to the pedestal, and is prevented from turning on the pedestal in any desired manner. In the drawing I have shown an internal longitudinal groove 12 which receives a spline 13 on the outside of the upper portion of the pedestal. A foot-lift 14 is preferably formed on one side of the housing.

Resting on the upper side of the bevel gear 5 is a thrust bearing, shown to consist of two bearing plates 15 and 16 with bearing balls 17 and ball cage 18 between the plates. A nut 19 is provided with a radial flange 20 which rests on this thrust bearing and has a circumferential flange 22 which is attached to the flange 23 of the housing by the screws 24. The nut is thereby prevented from turning and the upward thrust of the screw 4 is transferred to the foot-lift 14 of the housing.

Mounted in this nut 19 is an inner screw 25 which has a head or cap 26 rotatably mounted on its upper end and which has its lower end formed with longitudinal lugs 28 which slide in the inner longitudinal grooves 27 in the hollow outer screw 4 and thus prevent the inner screw from turning relative to the outer.

As the inner screw can be moved longitudinally upwardly nearly its own length out of the outer screw and the outer screw can be moved upwardly nearly its length out of the pedestal, it follows that the distance the cap 26 can be elevated is nearly twice the original height of this cap.

The elevation of the cap 26 will be changed a distance equal to the sum of the actual pitches of the threads of the two screws for each turn of the bevel gear 5. If the threads of the two screws are both right or both left handed, the actual pitches will be added, but if one is right handed and the other left handed, the difference in these pitches will be the distance the cap 26 is moved. In practice, I prefer to have the threads of both screws right handed.

In order to prevent the inner screw from being moved upward too far and the lugs 28 from contacting with the nut 19, I prefer to end the grooves 27 at the points 29. This insures sufficient support for the inner screw in the nut 19 and in the outer hollow screw 4.

While I have shown the operating device attached to the top of the outer screw, it is evident that it may be connected to any desirable or convenient portion of either screw and that it may be manually or power actuated. While I have described the mechanism as a lifting jack, this term is to be understood as of sufficient breadth to cover the adaptation of this screw mechanism to any desired combination of parts so long as it is employed for exerting pressure longitudinally of the screws.

The details of construction and the proportions of the parts of this lifting jack may, however, be changed by those skilled in the art without departing from the spirit of my invention as set forth in the following claims.

I claim:—

1. In a lifting jack, a pedestal embodying a nut, a screw mounted therein, means to rotate the screw, a nut mounted on the screw, a second screw mounted in said nut, means to prevent the nut from rotating, and means to cause the second screw to turn with the first.

2. In a lifting jack, a pedestal embodying a nut, a screw mounted therein, a nut mounted on the screw, a second screw mounted in the second nut and rotatable with the first screw, and means to rotate the screw relative to the nuts.

3. In a lifting jack, a pedestal embodying a nut, a hollow screw mounted therein, a nut mounted on the screw, a second screw in said second nut and slidable in the hollow screw and rotatable therewith, means to rotate the screws, and means to prevent the second nut from turning.

4. In a lifting jack, a pedestal embodying a nut, a hollow screw mounted therein, a nut mounted on the screw, a second screw extending centrally within the hollow screw and mounted in the nut carried thereby, gears to rotate the hollow screw in said pedestal, and means to prevent the nut supported by the hollow screw from turning.

5. In a lifting jack, a pedestal embodying a nut, a hollow screw mounted therein, a nut mounted on the screw, a second screw extending centrally within the hollow screw and mounted in the nut carried thereby, gears to rotate the hollow screw in said pedestal, and means to prevent the nut supported by the hollow screw from turning and comprising a tubular housing enclosing the pedestal and attached to the nut and having a splined connection with said pedestal.

6. In a device of the character described, a pedestal embodying a nut, a hollow screw mounted therein, a nut mounted on the screw, a second screw extending centrally within the hollow screw and mounted in the nut carried thereby, gears to rotate the hollow screw in said pedestal, and means to prevent the nut supported by the hollow screw from turning and comprising a tubular housing enclosing the pedestal and attached to the nut and having a splined connection with said pedestal and a foot-lift attached to said housing.

7. In a device of the character described, the combination of a pair of telescoping screws, a stationary nut for the outer screw, a non-rotatable nut for the inner screw mounted on the outer screw, and means to rotate the two screws.

8. In a device of the character described, the combination of a pair of telescoping screws, a stationary nut for the outer screw, a non-rotatable nut for the inner screw mounted on the outer screw, and means to rotate the two screws simultaneously and in the same direction.

9. In a load lifting device, the combination of a support embodying a nut, a screw mounted in the nut, a nut carried by said screw, a second screw mounted in the second nut and adapted to engage the load and rotatable with the first screw, and means to cause relative rotation between the screws and nuts.

JOHN CORYELL.